US009939917B2

(12) United States Patent
Jordan

(10) Patent No.: US 9,939,917 B2
(45) Date of Patent: Apr. 10, 2018

(54) DATA ENTRY PAD FOR ENTERING INFORMATION RELATED TO LAND AND MINERAL INTERESTS AND/OR GEOGRAPHIC LOCATIONS

(71) Applicant: Horizon Landboards, LLC, Edmond, OK (US)

(72) Inventor: Jonathan Evan Jordan, Edmond, OK (US)

(73) Assignee: Horizon Landboards, LLC, Edmond, OK (US)

( * ) Notice: Subject to any disclaimer, the term of this patent is extended or adjusted under 35 U.S.C. 154(b) by 3 days.

(21) Appl. No.: 14/665,838

(22) Filed: Mar. 23, 2015

(65) Prior Publication Data

US 2016/0282954 A1  Sep. 29, 2016

(51) Int. Cl.
  *G06F 3/02*  (2006.01)
  *G06F 3/0488*  (2013.01)

(52) U.S. Cl.
  CPC .............. *G06F 3/02* (2013.01); *G06F 3/0219* (2013.01); *G06F 3/04886* (2013.01)

(58) Field of Classification Search
  CPC ....... G06F 3/02; G06F 3/0219; G06F 3/04886
  USPC .................................................. 345/168, 174
  See application file for complete search history.

(56) References Cited

U.S. PATENT DOCUMENTS

| 5,584,588 | A | 12/1996 | Harbaugh |
| 5,879,089 | A | 3/1999 | Armel |
| 7,216,588 | B2 | 5/2007 | Suess |
| 7,439,959 | B2 | 10/2008 | Sako |
| 8,565,419 | B2 | 10/2013 | Pathiyal |
| 8,627,224 | B2 | 1/2014 | Dahl |
| 2007/0152980 | A1 | 7/2007 | Kocienda et al. |
| 2007/0216651 | A1* | 9/2007 | Patel .................... G06F 3/0237 345/168 |
| 2008/0136783 | A1* | 6/2008 | Pedrazzoli ............. G06F 3/023 345/172 |
| 2008/0205960 | A1 | 8/2008 | Siddeeq |
| 2008/0284744 | A1 | 11/2008 | Park et al. |
| 2010/0293498 | A1* | 11/2010 | Maxfield ............... G06F 3/0219 715/776 |
| 2010/0333011 | A1 | 12/2010 | Kornev et al. |
| 2016/0062632 | A1* | 3/2016 | Adams ................ G06F 3/04883 715/763 |
| 2016/0188114 | A1* | 6/2016 | Kim ...................... G06F 3/0418 345/174 |

\* cited by examiner

*Primary Examiner* — Stephen Sherman
(74) *Attorney, Agent, or Firm* — Dunlap Codding, P.C.

(57) ABSTRACT

A data entry pad is described herein comprising a plurality of keys with each corresponding to a predefined sequence of characters indicative of at least one of a geographic size and geographic location related to land or mineral interests. A data entry pad is also described herein comprising a plurality of distinct and non-overlapping regions with at least one region of the plurality of distinct and non-overlapping regions encompassing a plurality of keys with each key corresponding to a predefined sequence of characters indicative of at least one of a geographic size and geographic location related to land or mineral interests.

16 Claims, 7 Drawing Sheets

DATA ENTRY PAD FOR ENTERING INFORMATION RELATED TO LAND AND MINERAL INTERESTS AND/OR GEOGRAPHIC LOCATIONS

FIELD

The presently disclosed and/or claimed inventive concept(s) relates generally to a data entry pad comprising a plurality of keys corresponding to a predefined sequence of characters indicative of geographic sizes and/or geographic locations related to land and/or mineral interests. The presently disclosed and/or claimed inventive concept(s) also relates to a data entry pad having a plurality of distinct and non-overlapping regions with at least one region encompassing a plurality of keys with each key corresponding to a predefined sequence of characters indicative of a geographic size and/or geographic location related to land and/or mineral interests.

BACKGROUND

Data entry pads, otherwise referred to herein as "keypads" or "keyboards," are used in conjunction with numerous electronic devices. Common examples of data entry pads are: (i) physical keypads that can be externally or internally connected to one or more devices, (ii) virtual keypads on, e.g., touch screen devices, and (iii) virtual laser keypads—all of which act as input devices in one way or another. Not all data entry pads, however, convey the same information in the same way. For example, the majority of computer keyboards have both a numeric keypad and an alphabetic (e.g., "QWERTY") keypad capable of conveying information in a variety of ways. As such, many variations of keypads and keyboards have been developed over the years—each one modified in order to increase its functionality and/or efficiency for a particular use, setting, and/or device with which it is to be used. See, e.g., U.S. Pat. Nos. 8,627,224 and 7,439,959, and U.S. Patent Publication Nos. 2008/0205960, 2010/0333011, and 2008/0284744, all of which are hereby incorporated by reference herein in their entirety.

One particular use of data entry pads is for entering information related to land and/or mineral interests (e.g., oil, natural gas, and precious metals) into electronic devices using, for example, computer executable code interfaces. Until the presently disclosed and/or claimed inventive concept(s), users (e.g., landmen, title attorneys, county clerks, and county assessors) had to enter such land and/or mineral-related information into electronic devices by pressing multiple keys on a keypad in order to produce terms or abbreviations repeatedly used in the field. For example, each letter of terms like "section," "township," "range," "mineral," "degrees," "rods," and "chains" had to be entered by pressing numerous keys on a keypad in a particular order and in succession to form the desired word. Additionally, each letter, number, and punctuation mark likewise had to be entered by pressing numerous keys on a keypad in a particular order and in succession to form desired abbreviations like "N/2," "S/2," "E/2," and "W/2," all of which can be used over and over again when entering information related to land and/or mineral interests.

As such, there is a need for a data entry pad comprising a plurality of geographic indication keys with each key corresponding to a predefined sequence of characters corresponding to terms and/or abbreviations indicative of geographic sizes and/or geographic locations related to land and/or mineral interests in order to decrease the number of keystrokes needed to enter a single term and/or abbreviation related to land and/or mineral interests into an electronic device using, e.g., computer executable code interfaces.

BRIEF SUMMARY OF THE DRAWINGS

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing.

DETAILED DESCRIPTION

Figure 1:
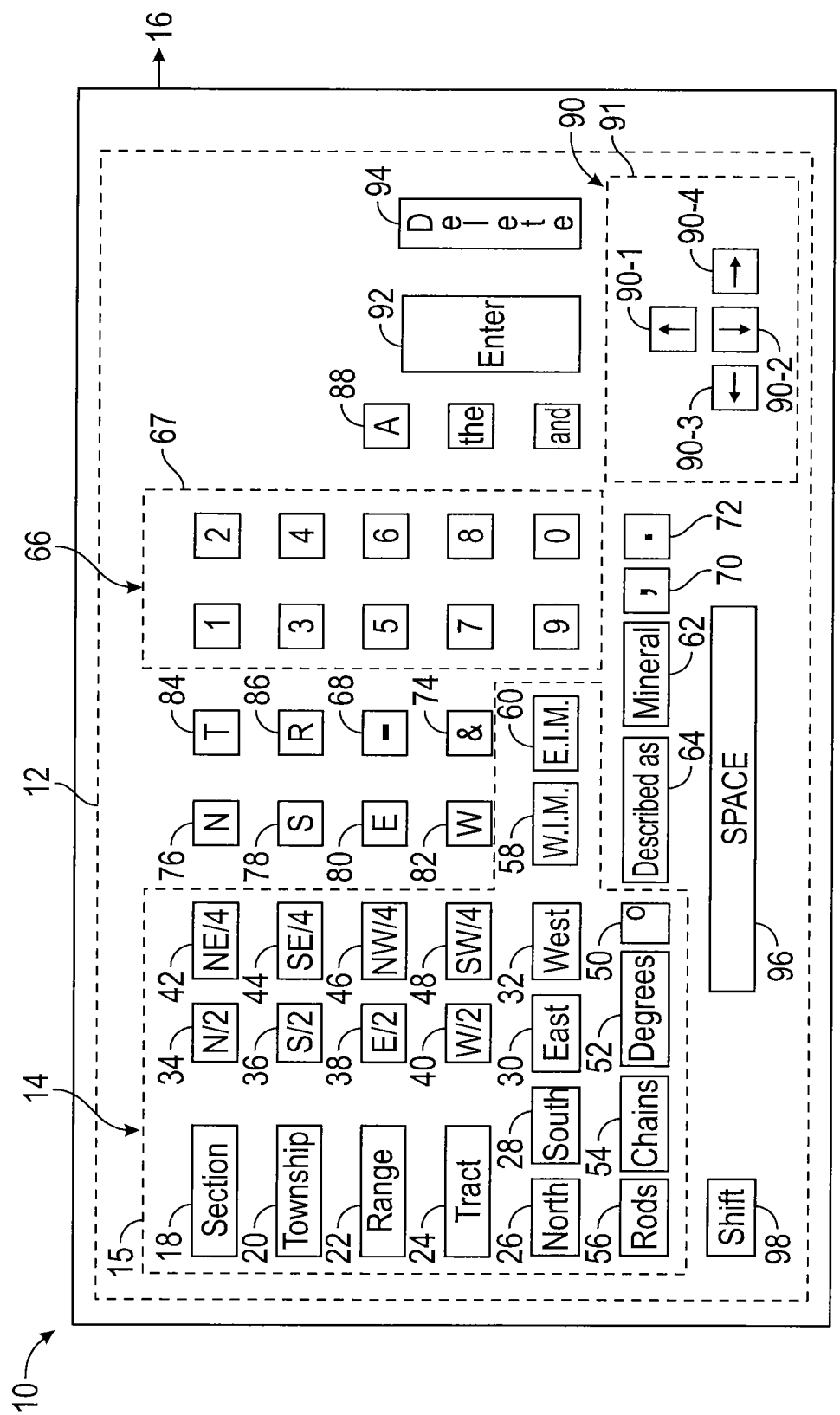
FIG. 1 illustrates an exemplary data entry pad comprising a number of keys, including a plurality of geographic indication keys with each geographic indication key corresponding to a predefined sequence of characters indicative of geographic sizes and/or geographic locations related to land and/or mineral interests.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein is for purposes of description, and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms should include the singular.

The following detailed description refers to the accompanying drawings. The same reference numbers in different drawings may identify the same or similar elements.

As used in the description herein, the terms "comprises," "comprising," "includes," "including," "has," "having," or any other variations thereof, are intended to cover a non-exclusive inclusion. For example, unless otherwise noted, a process, method, article, or apparatus that comprises a list of elements is not necessarily limited to only those elements, but may also include other elements not expressly listed or inherent to such process, method, article, or apparatus.

Further, unless expressly stated to the contrary, "or" refers to an inclusive and not to an exclusive "or". That is, the use of the term "or" is used to mean "and/or" unless explicitly indicated to refer to alternatives only or the alternatives are mutually exclusive, although the disclosure supports a definition that refers to only alternatives and "and/or." For example, a condition A or B is satisfied by any one of the following: A is true (or present) and B is false (or not present), A is false (or not present) and B is true (or present), and both A and B are true (or present).

In addition, use of the words "a" or "an" are employed to describe elements and components of the embodiments herein. This is done merely for convenience and to give a general sense of the inventive concept. This description should be read to include one or more, and the singular also includes the plural unless it is obvious that it is meant otherwise. Further, the use of the term "plurality" is meant to convey "more than one" unless expressly stated to the contrary.

Throughout this application, the term "about" is used to indicate that a value includes the inherent variation of error for the quantifying device, the method being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting, as lower or higher limits may also produce satisfactory results. In addition, the use of the phrase "at least one of X, V, and Z" will be understood to include X alone, V alone, and Z alone, as well as any combination of X, V, and Z. The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example.

Circuitry, as used herein, may be analog and/or digital components, or one or more suitably programmed processors (e.g., microprocessors) and associated hardware and software, or hardwired logic. Also, "components" may perform one or more function. The term "component," may include hardware, such as a processor (e.g., a microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instruction that when executed by one or more components cause the component to perform a specified function. It should be understood that the algorithms described herein may be stored on one or more non-transient memory. Exemplary non-transient memory may include, for example but without limitation, random access memory, read only memory, flash memory, and/or the like. Such non-transient memory may be electrically based, optically based, and/or the like.

It is further understood that, as used herein, the term "user" is not limited to a human being, and may comprise a computer, a server, a website, a processor, a network interface, a human, a user terminal, a virtual computer, combinations thereof, and the like, for example.

As used herein, the term "key" may encompass one or more keys, buttons, caps, keycaps, or any other term used to indicate a "key" that is pressed or otherwise selectable on either (i) a physical data entry pad (e.g., a wired or wireless external keyboard or an internal keyboard), (ii) a virtual data entry pad (e.g., a data entry pad on a touchscreen device), and/or (iii) a virtual laser data entry pad. Additionally, the term "key" may encompass any graphic and/or particular zone on a virtual data entry pad (e.g., a data entry pad on a touchscreen device) that is pressed or otherwise selectable by a user to carry out a function by an electronic device.

As used herein, the term "pressed" may encompass any action or means by which a key, as defined above, is indicated or otherwise selected to carry out a function by a mechanical and/or electronic device. In one non-limiting example, a physical key can be pressed by any object (including, e.g., a user's finger when the user is a human being) that causes the key to engage a switching mechanism, for example, capable of generating a signal that ultimately corresponds to a character, a predefined sequence of characters, or a computer executable function, as described in more detail herein. In another non-limiting example, a virtual key can be pressed by any object (including, e.g., a user's finger when the user is a human being) capable of functioning with, for example, a resistive system, a capacitive system, and/or a surface acoustic wave system, such that a signal is generated that ultimately corresponds to a character, a predefined sequence of characters, or a computer executable function, as described in more detail herein. In yet another non-limiting example, a key for a virtual laser keypad can be pressed by any object (including, e.g., a user's finger when the user is a human being) capable of passing through the infrared light from an IR laser diode situated above a particular key such that a signal is generated for the particular key ultimately corresponding to a character, a predefined sequence of characters, or a computer executable function, as described in more detail herein.

The term "indicia", as used herein, may encompass any text and/or graphic on one or more keys identifying the one or more keys, or more specifically, identifying the output and/or computer executable function of the one or more keys when pressed or otherwise selected. In particular, as used herein, the term "indicia" may encompass any text and/or graphic on one or more keys corresponding to a predefined sequence of characters or computer executable function to which the one or more keys correspond, as provided in more detail herein.

Referring now to the Figures, and in particular to FIG. 1, shown therein is a data entry pad 10 generally comprising keys 12, including a plurality of geographic indication keys 14 corresponding to a predefined sequence of characters indicative of at least one of a geographic size and/or geographic location, and an output 16. Although not shown in FIG. 1, the data entry pad 10 further comprises circuitry comprising (i) at least one sensor corresponding to at least one of the keys 12 and (ii) a keyboard encoder including a processor and non-transient memory, wherein the circuitry (a) receives a first signal when one or more of the keys 12 are pressed and (b) outputs a second signal in a format readable by a keyboard controller corresponding to a character, a predefined sequence of characters, or a computer executable function corresponding to one or more of the keys 12 that are pressed. In one example, the first signal may be a scan code in the form of a data packet representing the state of one or more of the keys 12. In one example, the second signal is in an ASCII format.

In one embodiment, at least a portion of the keys 12 can be categorized as a plurality of geographic indication keys 14, wherein each one of the geographic indication keys 14 corresponds to a predefined sequence of characters indicative of a geographic size and/or geographic location related to land and/or mineral interests. The circuitry of the data entry pad 10, as described above, both (a) receives a first signal when one or more of the geographic indication keys 14 are pressed and (b) outputs a second signal corresponding to the predefined sequence of characters corresponding to the one or more geographic indication keys 14.

For example, the predefined sequence of characters indicative of a geographic size and/or geographic location for one of the geographic indication keys 14 may, in one non-limiting example, comprise the letters "s", "e", "c", "t", "i", "o", "n" in such an order so as to output a second signal corresponding to the term "section" when the corresponding geographic indication key 14 is pressed. In another example, the predefined sequence of characters indicative of a geographic size and/or geographic location for another one of the geographic indication keys 14 may, in one non-limiting example, comprise the letter and symbols "N", "/", "2" in such an order so as to output a second signal corresponding to the abbreviation "N/2" when the corresponding geographic indication key 14 is pressed. Although FIG. 1 shows the keys as having either square or rectangle shapes, other shapes as known to a person of ordinary skill in the art may be utilized, without limitation.

In one embodiment, each one of the geographic indication keys 14 corresponds to and/or has indicia thereon indicative of a predefined sequence of characters selected from the group consisting of "section" 18, "township" 20, "range" 22, "tract" 24, "north" 26, "south" 28, "east" 30, "west" 32, "N/2" 34, "S/2" 36, "E/2" 38, "W/2" 40, "NE/4" 42, "SE/4" 44, "NW/4" 46, "SW/4" 48, "°" 50, "degrees" 52, "chains" 54, "rods" 56, "W.I.M" 58, "E.I.M." 60, and combinations thereof.

In another embodiment, the data entry pad 10 comprises keys 12, wherein at least one of the keys 12 corresponds to and/or has indicia thereon indicative of a predefined sequence of characters selected from the group consisting of "mineral" 62, "described as" 64, and combinations thereof.

In an embodiment, at least a portion of the keys 12 of any of the above-described embodiments of the data entry pad 10 may comprise numeric keys 66 corresponding to characters selected from the group consisting of numeric symbols ranging from 0 to 9, punctuation keys 68, 70, 72, 74, and combinations thereof. The punctuation keys 68, 70, 72, 74 may be selected from the group consisting of a hyphen 68, comma 70, period 72, ampersand 74, semicolon (not shown), underscore (not shown), parentheses (not shown), brackets (not shown), asterisks (not shown), and combinations thereof.

At least a portion of the keys 12 of any of the above-described embodiments of the data entry pad 10 may correspond to characters that are well known by persons of ordinary skill in the art including, for example but without limitation, letters of the alphabet like N 76, S 78, E 80, W 82, T 84, R 86, and A 88.

At least a portion of the keys 12 of the data entry pad 10, as described in any one of the above-mentioned embodiments, may be characterized as navigation keys 90 selected from the group consisting of an up arrow 90-1, a down arrow 90-2, a left arrow 90-3, a right arrow 90-4, and combinations thereof. At least a portion of the keys 12 of the data entry pad 10, as described in any one of the above-mentioned embodiments, may also be characterized as one or more functional keys 92, 94, 96, 98, wherein the one or more functional keys 92, 94, 96, 98 may be selected from the group consisting of enter 92, delete 94, space 96, shift 98, and combinations thereof.

In another embodiment, the data entry pad 10 comprises a plurality of distinct and non-overlapping regions encompassing keys 12 corresponding to a plurality of characters associated with a particular region. The plurality of distinct and non-overlapping regions may comprise at least one of a geographic location region 15, a numeric region 67, and/or a navigation region 91. In one embodiment, the geographic location region 15 encompasses a plurality of geographic indication keys 14 corresponding to a predefined sequence of characters indicative of at least one of a geographic size and/or location. The numeric region 67 may encompass a plurality of numeric keys 66 corresponding to characters selected from the group consisting of numeric symbols ranging from 0 to 9. The navigation region 91 may encompass a plurality of navigation keys 90 corresponding to functions corresponding to an up arrow 90-1, a down arrow 90-2, a left arrow 90-3, and right arrow 90-4, which may assist in moving one or more cursors on the electronic device.

In yet another embodiment, the data entry pad 10 comprising the plurality of distinct and non-overlapping regions, as described above, further comprises at least one or more keys 12 that are not within a region, wherein at least one of the keys 12 not within a region corresponds to a predefined sequence of characters selected from the group consisting of "mineral" 62, "described as" 64, and combinations thereof. Additionally, the above-described data entry pad 10 comprising the plurality of distinct and non-overlapping regions, as described above, may also comprise any additional keys 12 corresponding to characters that are well known by persons of ordinary skill in the art including, for example but without limitation, letters of the alphabet like N 76, S 78, E 80, W 82, T 84, R 86, and A 88.

The data entry pad 10, as described in any one of the above-mentioned embodiments, may have the keys 12 arranged in a plurality of rows and/or columns. Alternatively, the keys 12 can be arranged in any pattern, design, or layout that may or may not include a plurality of rows and/or columns.

In one embodiment, the data entry pad 10 is a physical keypad, wherein the data entry pad 10 is connected to an electronic device via the output 16. The output 16 can be at least one of an external connector, an internal connector, and/or a wireless connector. The electronic device can be, for example but without limitation, a smart phone, computer, tablet, television, personal digital assistant ("PDA"), and combinations thereof. The electronic device may be any device having a keyboard controller (as described above) and is capable of (a) receiving an input from the data entry pad 10 via an external connector, an internal connector, and/or a wireless connector and (b) supplying the input to the keyboard controller for use within the electronic device.

Figure 2:
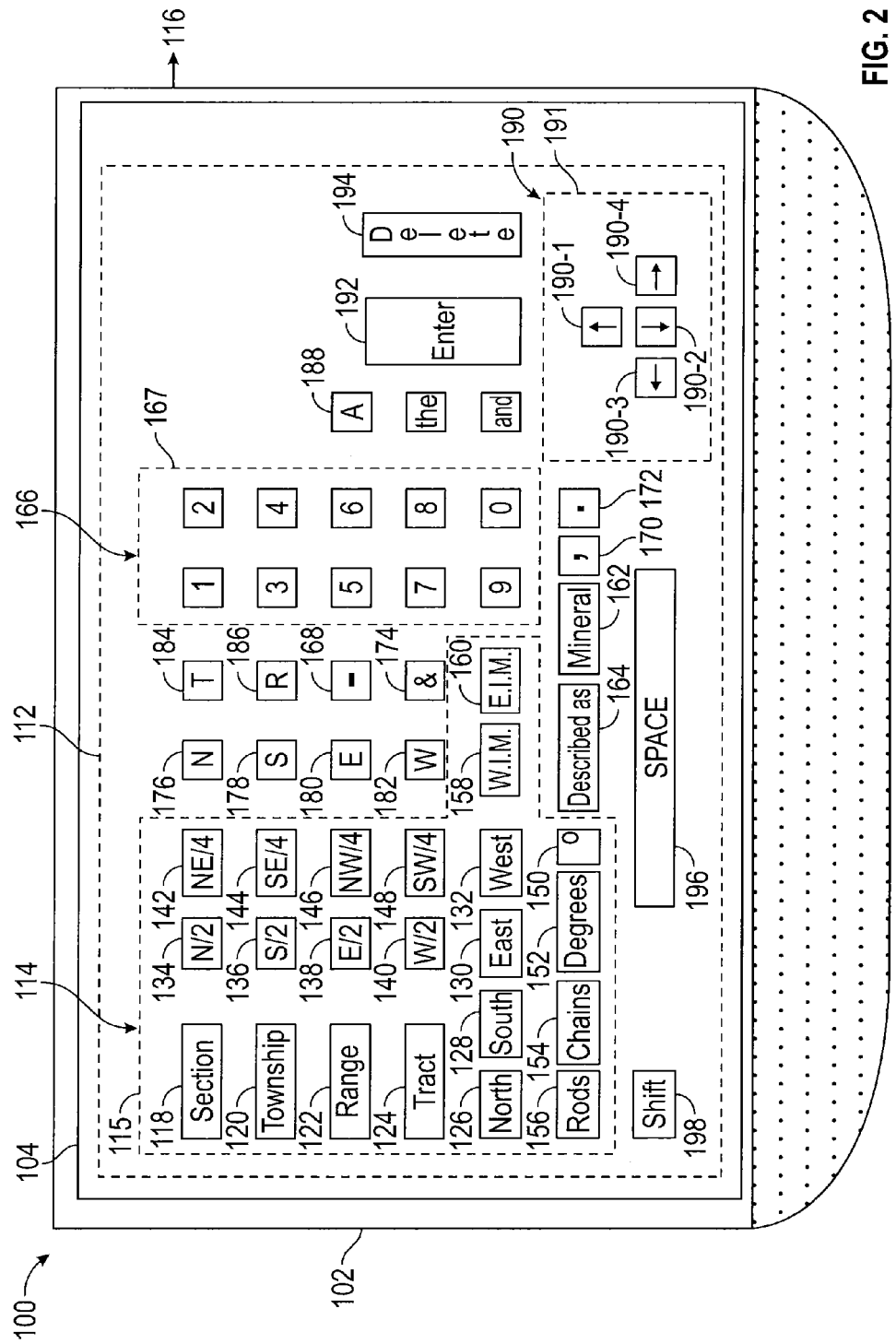
FIG. 2 illustrates an exemplary external keyboard comprising a housing and a physical (as opposed to virtual) data entry pad comprising a number of keys, including a plurality of geographic indication keys with each geographic indication key corresponding to a predefined sequence of characters indicative of geographic sizes and/or geographic locations related to land and/or mineral interests.

FIG. 2 illustrates an external keyboard 100, which is a physical keypad generally comprising a housing 102 and a physical (as opposed to virtual) data entry pad 104 comprising keys 112, including a plurality of geographic indication keys 114 corresponding to a predefined sequence of characters indicative of at least one of a geographic size and/or location, and an output 116. Although not shown in FIG. 2, the external keyboard 100 further comprises circuitry comprising (i) at least one sensor corresponding to at least one of the keys 112 and (ii) a keyboard encoder including a processor and non-transient memory, wherein the circuitry (a) receives a first signal when one or more of the keys 112 are pressed and (b) outputs a second signal in a format readable by a keyboard controller via the output 116 corresponding to a character, a predefined sequence of characters, or a computer executable function corresponding to one or more of the keys 112. In one example, the first signal may be a scan code in the form of a data packet representing the state of one or more of the keys 112. In one example, the second signal is in an ASCII format.

The output 116 can be an external connector and/or a wireless connector such that the output 116 can act as an input means for the electronic device. The external connector may be selected from the group consisting of a PS/2 connector, a Universal Serial Bus connector, and combinations thereof. The wireless connector may use a connection mechanism selected from the group consisting of infrared (IR), radio frequency (RF), Bluetooth, and combinations thereof. The electronic device can be selected from the group consisting of a smart phone, computer, tablet, television, PDA, and combinations thereof. The electronic device may be any device having a keyboard controller (as described above) and is capable of (a) receiving an input from the external keyboard 100 via the output 116 selected from the group consisting of an external connector, a wireless connector, and/or combinations thereof, and (b) supplying the input to the keyboard controller for use within the electronic device.

In one embodiment, at least a portion of the keys 112 can be categorized as a plurality of geographic indication keys 114, wherein each one of the geographic indication keys 114 corresponds to a predefined sequence of characters indicative of geographic size and/or geographic location related to land and/or mineral interests. The circuitry of the external keyboard 100, as described above, both (a) receives a first signal when one or more of the geographic indication keys 114 are pressed and (b) outputs a second signal (via the output 116) corresponding to the predefined sequence of characters corresponding to the one or more geographic indication keys 114.

For example, the predefined sequence of characters indicative of a geographic size and/or geographic location for one of the geographic indication keys 114 may, in one non-limiting example, comprise the letters "s", "e", "c", "t", "i", "o", "n" in such an order so as to output a second signal corresponding to the term "section" when the corresponding geographic indication key 114 is pressed. In another example, the predefined sequence of characters indicative of a geographic size and/or geographic location for another one of the geographic indication keys 114 may, in one non-limiting example, comprise the letter and symbols "N", "/", "2" in such an order so as to output a second signal corresponding to the abbreviation "N/2" when the corresponding geographic indication key 114 is pressed. Although FIG. 2 shows the keys as having either square or rectangle shapes, other shapes as known to a person of ordinary skill in the art may be utilized, without limitation.

In one embodiment, the at least one sensor corresponding to at least one of the keys 112 comprises a switching mechanism selected from the group consisting of a membrane-type mechanism, a buckling spring type mechanism, and combinations thereof. Alternatively, the switching mechanism can be any mechanism as would be known by persons of ordinary skill in the art that has the ability to generate a signal corresponding to a character, a predefined sequence of characters, or a computer executable function when one or more keys 112 are pressed or otherwise selected. In an embodiment, the at least one sensor corresponds to at least one of the geographic indication keys 114, and comprises any switching mechanism as would be known by persons of ordinary skill in the art that has the ability to generate a signal corresponding to a predefined sequence of characters indicative of a geographic size and/or geographic location related to land and/or mineral interests.

In one embodiment, each one of the geographic indication keys 114 corresponds to and/or has indicia thereon indicative of a predefined sequence of characters selected from the group consisting of "section" 118, "township" 120, "range" 122, "tract" 124, "north" 126, "south" 128, "east" 130, "west" 132, "N/2" 134, "S/2" 136, "E/2" 138, "W/2" 140, "NE/4" 142, "SE/4" 144, "NW/4" 146, "SW/4" 148, "°" 150, "degrees" 152, "chains" 154, "rods" 156, "W.I.M." 158, "E.I.M." 160, and combinations thereof.

In another embodiment, the external keyboard 100 comprises keys 112, wherein at least one of the keys 112 corresponds to and/or has indicia thereon indicative of a predefined sequence of characters selected from the group consisting of "mineral" 162, "described as" 164, and combinations thereof.

In an embodiment, at least a portion of the keys 112 of the above-described embodiments of the external keyboard 100 may comprise numeric keys 166 corresponding to characters selected from the group consisting of numeric symbols ranging from 0 to 9, punctuation keys 168, 170, 172, 174, and combinations thereof. The punctuation keys 168, 170, 172, 174 may be selected from the group consisting of a hyphen 168, comma 170, period 172, ampersand 174, semicolon (not shown), underscore (not shown), parentheses (not shown), brackets (not shown), asterisks (not shown), and combinations thereof.

At least a portion of the keys 112 of the above-described embodiments of the external keyboard 100 may correspond to characters that are well known by persons of ordinary skill in the art including, for example but without limitation, letters of the alphabet like N 176, S 178, E 180, W 182, T 184, R 186, and A 188.

At least a portion of the keys 112 of the external keyboard 100, as described in any one of the above-mentioned embodiments, may be characterized as navigation keys 190 selected from the group consisting of an up arrow 190-1, a down arrow 190-2, a left arrow 190-3, a right arrow 190-4, and combinations thereof. At least a portion of the keys 112 of the external keyboard 100, as described in any one of the above-mentioned embodiments may also be characterized as one or more functional keys 192, 194, 196, 198, wherein the one or more functional keys 192, 194, 196, 198 may be selected from the group consisting of enter 192, delete 194, space 196, shift 198, and combinations thereof.

In another embodiment, the external keyboard 100 comprises a plurality of distinct and non-overlapping regions encompassing keys 112 corresponding to a plurality of characters associated with a particular region. The plurality of distinct and non-overlapping regions may comprise at least one of a geographic location region 115, a numeric region 167, and/or a navigation region 191. In one embodiment, the geographic location region 115 encompasses a plurality of geographic indication keys 114 corresponding to a predefined sequence of characters indicative of at least one of a geographic size and/or location. The numeric region 167 may encompass a plurality of numeric keys 166 corresponding to characters selected from the group consisting of numeric symbols ranging from 0 to 9. The navigation region 191 may encompass a plurality of navigation keys 190 corresponding to computer executable functions corresponding to an up arrow 190-1, a down arrow 190-2, a left arrow 190-3, and right arrow 190-4, which may assist in moving one or more cursors on the electronic device In yet another embodiment, the external keyboard 100 comprising the plurality of distinct and non-overlapping regions, as described above, further comprises at least one or more keys 112 that are not within a region, wherein at least one of the keys 112 not within a region corresponds to a predefined sequence of characters selected from the group consisting of "mineral" 162, "described as" 164, and combinations thereof. Additionally, the above-described external keyboard 100 comprising the plurality of distinct and non-overlapping regions, as described above, may also comprise any additional keys 112 corresponding to characters that are well known by persons of ordinary skill in the art including, for example but without limitation, letters of the alphabet like N 176, S 178, E 180, W 182, T 184, R 186, and A 188.

The external keyboard 100, as described in any one of the above-mentioned embodiments, may have the keys 112 arranged in a plurality of rows and/or columns. Alternatively, the keys 112 can be arranged in any pattern, design, or layout that may or may not include a plurality of rows and/or columns.

Figure 3:
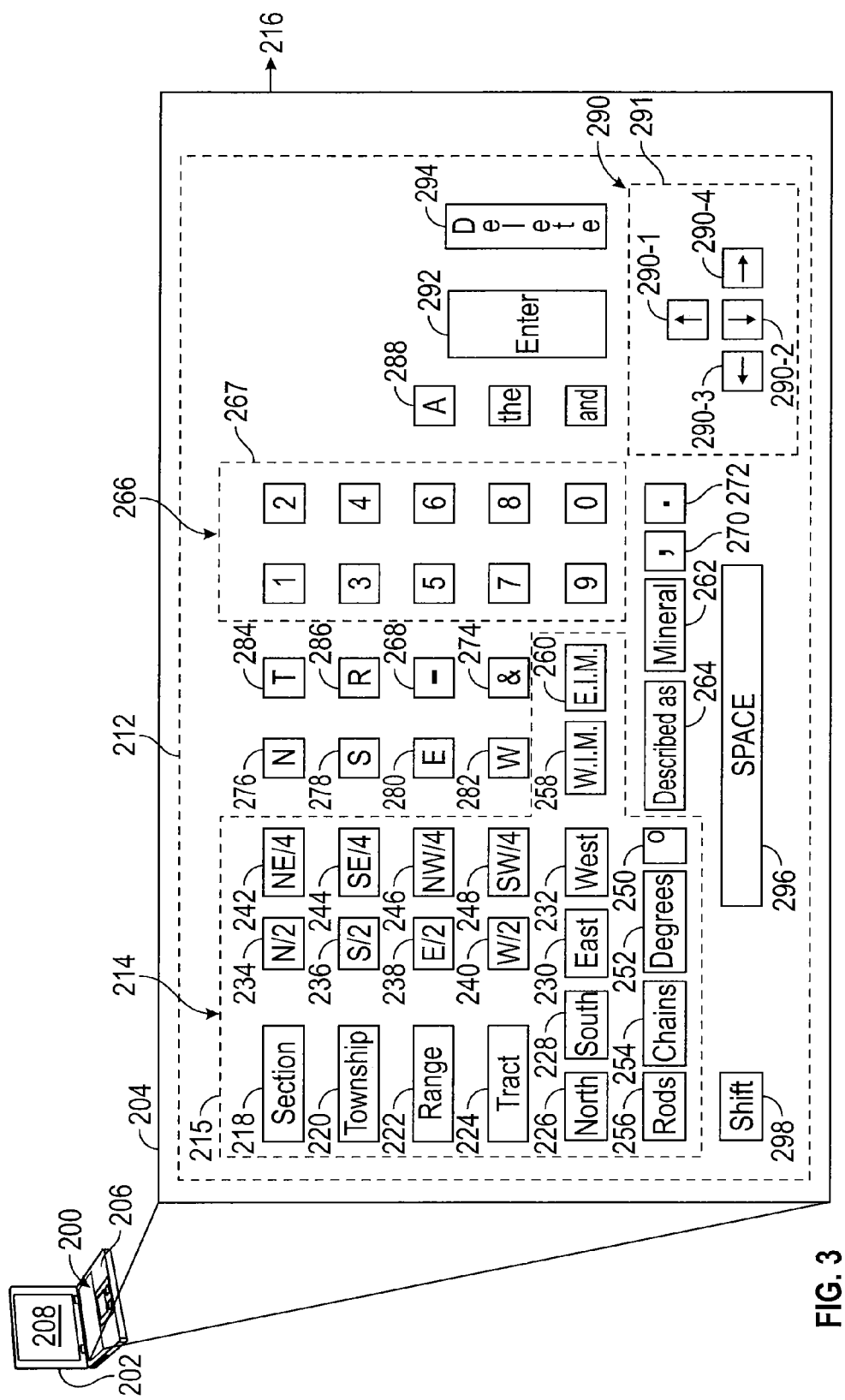
FIG. 3 illustrates an exemplary internal keyboard comprising a housing and a physical (as opposed to virtual) data entry pad comprising a number of keys, including a plurality of geographic indication keys with each geographic indication key corresponding to a predefined sequence of characters indicative of geographic sizes and/or geographic locations related to land and/or mineral interests.

Turning now to FIG. 3, FIG. 3 illustrates one non-limiting embodiment of an internal keyboard 200, wherein the internal keyboard 200 is in combination with an electronic device 202. The internal keyboard 200 comprises a physical (as opposed to virtual) data entry pad 204 comprising keys 212, including a plurality of geographic indication keys 214 corresponding to a predefined sequence of characters indicative of at least one of a geographic size and/or geographic location, and an output 216. The electronic device 202 may comprise a housing 206 for the internal keyboard 200 and a display 208 like, for example but without limitation, a laptop computer. The output 216 of the internal keyboard 200 may be connected to the electronic device 202 via an internal connector. Although not shown in FIG. 3, the internal keyboard 200 further comprises circuitry comprising (i) at least one sensor corresponding to at least one of the keys 212 and (ii) a keyboard encoder including a processor and non-transient memory, wherein the circuitry (a) receives a first signal when one or more of the keys 212 are pressed and (b) outputs a second signal in a format readable by a keyboard controller corresponding to a character, a predefined sequence of characters, or a computer executable function corresponding to one or more of the keys 212 that are pressed. In one example, the first signal may be a scan code in the form of a data packet representing the state of one or more of the keys 212. In one example, the second signal is in ASCII format.

In one embodiment, at least a portion of the keys 212 can be categorized as a plurality of geographic indication keys 214, wherein each one of the geographic indication keys 214 corresponds to a predefined sequence of characters indicative of a geographic size and/or geographic location related to land and/or mineral interests. The circuitry of the internal keyboard 200, as described above, both (a) receives a first signal when one or more of the geographic indication keys 214 are pressed and (b) outputs a second signal (via the output 216) corresponding to the predefined sequence of characters corresponding to the one or more geographic indication keys 214.

For example, the predefined sequence of characters indicative of a geographic size and/or geographic location for one of the geographic indication keys 214 may, in one non-limiting example, comprise the letters "s", "e", "c", "t", "i", "o", "n" in such an order so as to output a second signal corresponding to the term "section" when the corresponding geographic indication key 214 is pressed. In another example, the predefined sequence of characters indicative of a geographic size and/or geographic location for another one of the geographic indication keys 214 may, in one non-limiting example, comprise the letter and symbols "N", "/", "2" in such an order so as to output a second signal corresponding to the abbreviation "N/2" when the corresponding geographic indication key 214 is pressed. Although FIG. 3 shows the keys as having either square or rectangle shapes, other shapes as known to a person of ordinary skill in the art may be utilized, without limitation.

In one embodiment, the at least one sensor corresponding to at least one of the keys 212 comprises a switching mechanism selected from the group consisting of a membrane-type mechanism, a buckling spring type mechanism, and combinations thereof. Alternatively, the switching mechanism could be any mechanism as would be known by persons of ordinary skill in the art that has the ability to generate a character, a predefined sequence of characters, or a computer executable function when one or more keys 212 is pressed or otherwise selected. In an embodiment, the at least one sensor corresponds to at least one of the geographic indication keys 214, and comprises any switching mechanism as would be known by persons of ordinary skill in the art that has the ability to generate a predefined sequence of characters indicative of a geographic size and/or geographic location related to land or mineral rights.

In one embodiment, each one of the geographic indication keys 214 corresponds to and/or has indicia thereon indicative of a predefined sequence of characters selected from the group consisting of "section" 218, "township" 220, "range" 222, "tract" 224, "north" 226, "south" 228, "east" 230, "west" 232, "N/2" 234, "S/2" 236, "E/2" 238, "W/2" 240, "NE/4" 242, "SE/4" 244, "NW/4" 246, "SW/4" 248, "°" 250, "degrees" 252, "chains" 254, "rods" 256, "W.I.M." 258, "E.I.M." 260, and combinations thereof.

In another embodiment, the internal keyboard 200 comprises keys 212, wherein at least one of the keys 212 corresponds to and/or has indicia thereon indicative of a predefined sequence of characters selected from the group consisting of "mineral" 262, "described as" 264, and combinations thereof. In an embodiment, at least a portion of the keys 212 of any of the above-described embodiments of the internal keyboard 200 may comprise numeric keys 266 corresponding to characters selected from the group consisting of numeric symbols ranging from 0 to 9, punctuation keys 268, 270, 272, 274, and combinations thereof. The punctuation keys 268, 270, 272, 274 may be selected from the group consisting of a hyphen 268, comma 270, period 272, ampersand 274, semicolon (not shown), underscore (not shown), parentheses (not shown), brackets (not shown), asterisks (not shown), and combinations thereof.

At least a portion of the keys 212 of any of the above-described embodiments of the internal keyboard 200 may correspond to characters that are well known by persons of ordinary skill in the art including, for example but without limitation, letters of the alphabet like, for example but without limitation, N 276, S 278, E 280, W 282, T 284, R 286, and A 288.

At least a portion of the keys 212 of the internal keyboard 200, as described in any one of the above-mentioned embodiments, may be characterized as navigation keys 290 selected from the group consisting of an up arrow 290-1, a down arrow 290-2, a left arrow 290-3, a right arrow 290-4, and combinations thereof. At least a portion of the keys 212 of the internal keyboard 200, as described in any one of the above-mentioned embodiments, may also be characterized as one or more functional key 292, 294, 296, 298, wherein the one or more functional key 292, 294, 296, 298 may be selected from the group consisting of enter 292, delete 294, space 296, shift 298, and combinations thereof.

In another embodiment, the internal keyboard 200 comprises a plurality of distinct and non-overlapping regions encompassing a portion of keys 212 corresponding to a plurality of characters associated with a particular region. The plurality of distinct and non-overlapping regions may comprise at least one of a geographic location region 215, a numeric region 267, and/or a navigation region 291. In one embodiment, the geographic location region 215 encompasses a plurality of geographic indication keys 214 corresponding to a predefined sequence of characters indicative of at least one of a geographic size and/or location. The numeric region 267 may encompass a plurality of numeric keys 266 corresponding to characters selected from the group consisting of numeric symbols ranging from 0 to 9. The navigation region 291 may encompass a plurality of navigation keys 290 corresponding to functions corresponding to an up arrow 290-1, a down arrow 290-2, a left arrow 290-3, and right arrow 290-4, which may assist in moving one or more cursors on the electronic device.

In yet another embodiment, the internal keyboard 200 comprising the plurality of distinct and non-overlapping regions, as described above, further comprises a portion of keys 212 that are not within a region, wherein at least one of the keys 212 not within a region corresponds to a predefined sequence of characters selected from the group consisting of "mineral" 262, "described as" 264, and combinations thereof. Additionally, the above-described internal keyboard 200 comprising the plurality of distinct and non-overlapping regions, as described above, may also comprise any additional keys 212 corresponding to characters that are well known by persons of ordinary skill in the art including, for example but without limitation, letters of the alphabet like, for example but without limitation, N 276, S 278, E 280, W 282, T 284, R 286, and A 288.

The internal keyboard 200, as described in any one of the above-mentioned embodiments, may have the keys 212 arranged in a plurality of rows and/or columns. Alternatively, the keys 212 can be arranged in any pattern, design, or layout that may or may not include a plurality of rows and/or columns.

Figure 4:
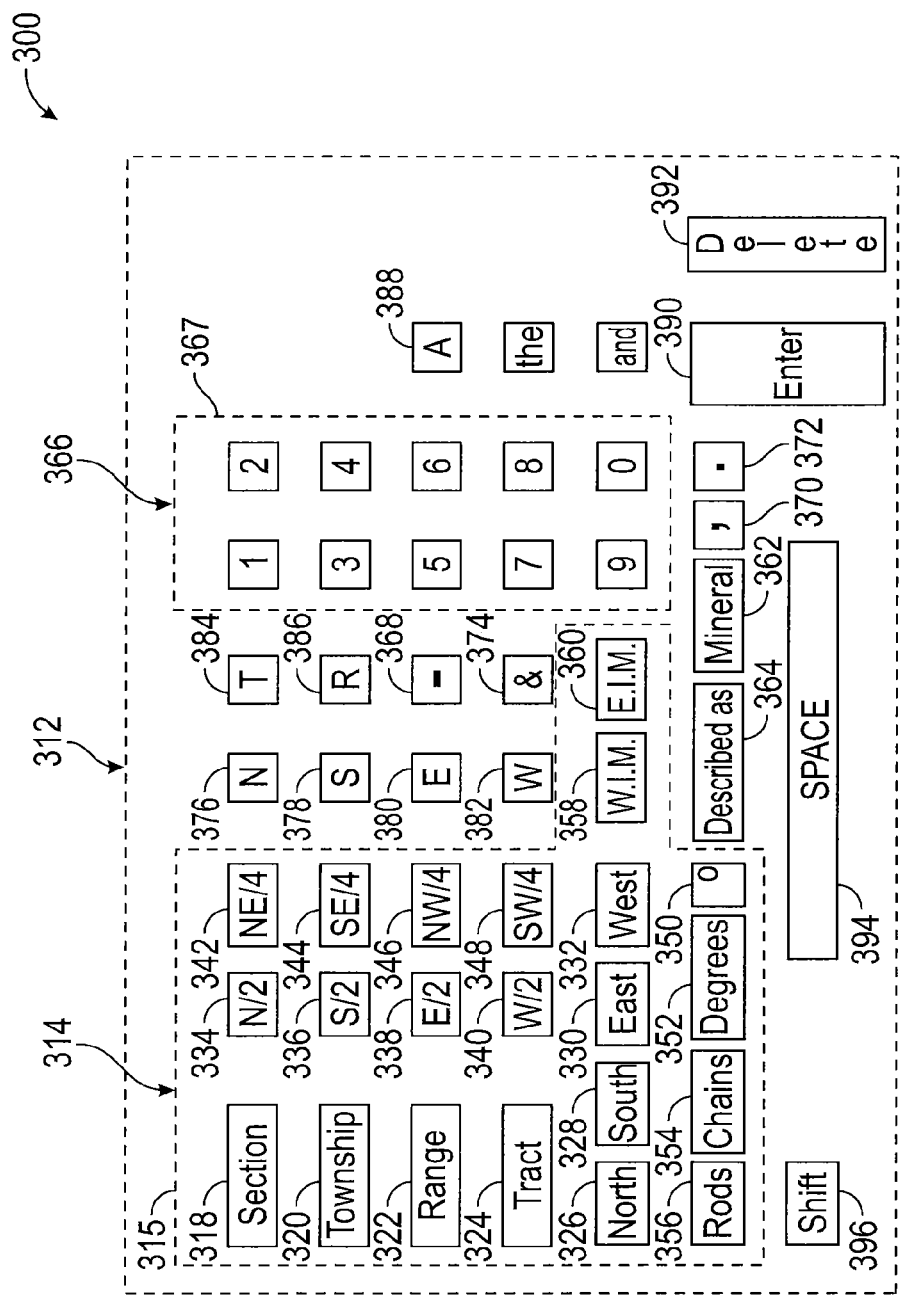
FIG. 4 illustrates an embodiment of a virtual data entry pad comprising a number of keys, including a plurality of geographic indication keys with each geographic indication key corresponding to a predefined sequence of characters indicative of geographic sizes and/or geographic locations related to land and/or mineral interests.

Turning now to FIG. 4. FIG. 4 illustrates an embodiment of a virtual data entry pad 300 comprising keys 312 as described above, including a plurality of geographic indication keys 314 corresponding to a predefined sequence of characters indicative of at least one of a geographic size and/or geographic location. Although not shown in FIG. 4, the virtual data entry pad 300 further comprises circuitry comprising at least one sensor corresponding to at least one of the keys 312, a processor, and non-transient memory, wherein the circuitry (a) receives a first signal when one or more of the keys 312 are pressed or otherwise selected and (b) outputs a second signal corresponding to a character, a predefined sequence of characters, or a computer executable function corresponding to one or more of the keys 312. The circuitry of at least one embodiment of the virtual data entry pad 300 is disclosed in more detail later herein. The virtual data entry pad 300 may be used with any touch screen compatible display as would be recognized by a person of ordinary skill in the art and discussed further herein.

In one embodiment, at least a portion of the keys 312 of the virtual data entry pad 300 can be categorized as a plurality of geographic indication keys 314, wherein each one of the geographic indication keys 314 corresponds to a predefined sequence of characters indicative of a geographic size and/or geographic location related to land and/or mineral interests. The circuitry of the virtual data entry pad 300, as described above, both (a) receives a first signal when one or more of the geographic indication keys 314 are pressed and (b) outputs a second signal corresponding to the predefined sequence of characters corresponding to the one or more geographic indication keys 314.

For example, the predefined sequence of characters indicative of a geographic size and/or geographic location for one of the geographic indication keys 314 may, in one non-limiting example, comprise the letters "s", "e", "c", "t", "i", "o", "n" in such an order so as to output a second signal corresponding to the term "section" when the corresponding geographic indication key 314 is pressed. In another example, the predefined sequence of characters indicative of a geographic size and/or geographic location for another one of the geographic indication keys 314 may, in one non-limiting example, comprise the letter and symbols "N", "/", "2" in such an order so as to output a second signal corresponding to the abbreviation "N/2" when the corresponding geographic indication key 314 is pressed. Although FIG. 4 shows the keys as having either square or rectangle shapes, other shapes as known to a person of ordinary skill in the art may be utilized, without limitation.

In one embodiment, each one of the geographic indication keys 314 corresponds to and/or has indicia thereon indicative of a predefined sequence of characters selected from the group consisting of "section" 318, "township" 320, "range" 322, "tract" 324, "north" 326, "south" 328, "east" 330, "west" 332, "N/2" 334, "S/2" 336, "E/2" 338, "W/2" 340, "NE/4" 342, "SE/4" 344, "NW/4" 346, "SW/4" 348, "°" 350, "degrees" 352, "chains" 354, "rods" 356, "W.I.M." 358, "E.I.M." 360, and combinations thereof.

In another embodiment, the virtual data entry pad 300 comprises keys 312, wherein at least one of the keys 312 corresponds to and/or has indicia thereon indicative of a predefined sequence of characters selected from the group consisting of "mineral" 362, "described as" 364, and combinations thereof. In an embodiment, at least a portion of the keys 312 of any of the above-described embodiments of the virtual data entry pad 300 may further comprise numeric keys 366 corresponding to characters selected from the group consisting of numeric symbols ranging from 0 to 9, punctuation keys 368, 370, 372, 374, and combinations thereof. The punctuation keys 368, 370, 372, 378 may be selected from the group consisting of a hyphen 368, comma 370, period 372, ampersand 374, semicolon (not shown), underscore (not shown), parentheses (not shown), brackets (not shown), asterisks (not shown), and combinations thereof.

At least a portion of the keys 312 of the above-described embodiments of the virtual data entry pad 300 may correspond to characters that are well known by persons of ordinary skill in the art including, for example but without limitation, letters of the alphabet like N 376, S 378, E 380, W 382, T 384, R 386, and A 388.

At least a portion of the keys 312 of the virtual data entry pad 300, as described in any one of the above-mentioned embodiments, may also be characterized as one or more one functional keys 390, 392, 394, 396, wherein the at least one functional key 390, 392, 394, 396 may be selected from the group consisting of enter 390, delete 392, space 394, shift 396, and combinations thereof.

In another embodiment, the virtual data entry pad 300 comprises a plurality of distinct and non-overlapping regions encompassing keys 312 corresponding to a plurality of characters associated with a particular region. The plurality of distinct and non-overlapping regions may comprise at least one of a geographic location region 315 and/or a numeric region 367. In one embodiment, the geographic location region 315 encompasses a plurality of geographic indication keys 314 corresponding to a predefined sequence of characters indicative of at least one of a geographic size and/or location. The numeric region 367 may encompass a plurality of numeric keys 366 corresponding to characters selected from the group consisting of numeric symbols ranging from 0 to 9.

In yet another embodiment, the virtual data entry pad 300 comprising the plurality of distinct and non-overlapping regions, as described above, further comprises at least one or more keys 312 that are not within a region, wherein at least one of the keys 312 corresponds to a predefined sequence of characters selected from the group consisting of "mineral" 362, "described as" 364, and combinations thereof. Additionally, the above-described virtual data entry pad 300 comprising the plurality of distinct and non-overlapping regions, as described above, may also comprise any additional keys 312 corresponding to characters that are well known by persons of ordinary skill in the art including, for example but without limitation, letters of the alphabet like, N 376, S 378, E 380, W 382, T 384, R 386, and A 388.

The virtual data entry pad 300, as described in any one of the above-mentioned embodiments, may have the keys 312 arranged in a plurality of rows and/or columns. Alternatively, the keys 312 can be arranged in any pattern, design, or layout that may or may not include a plurality of rows and/or columns.

Figure 5:
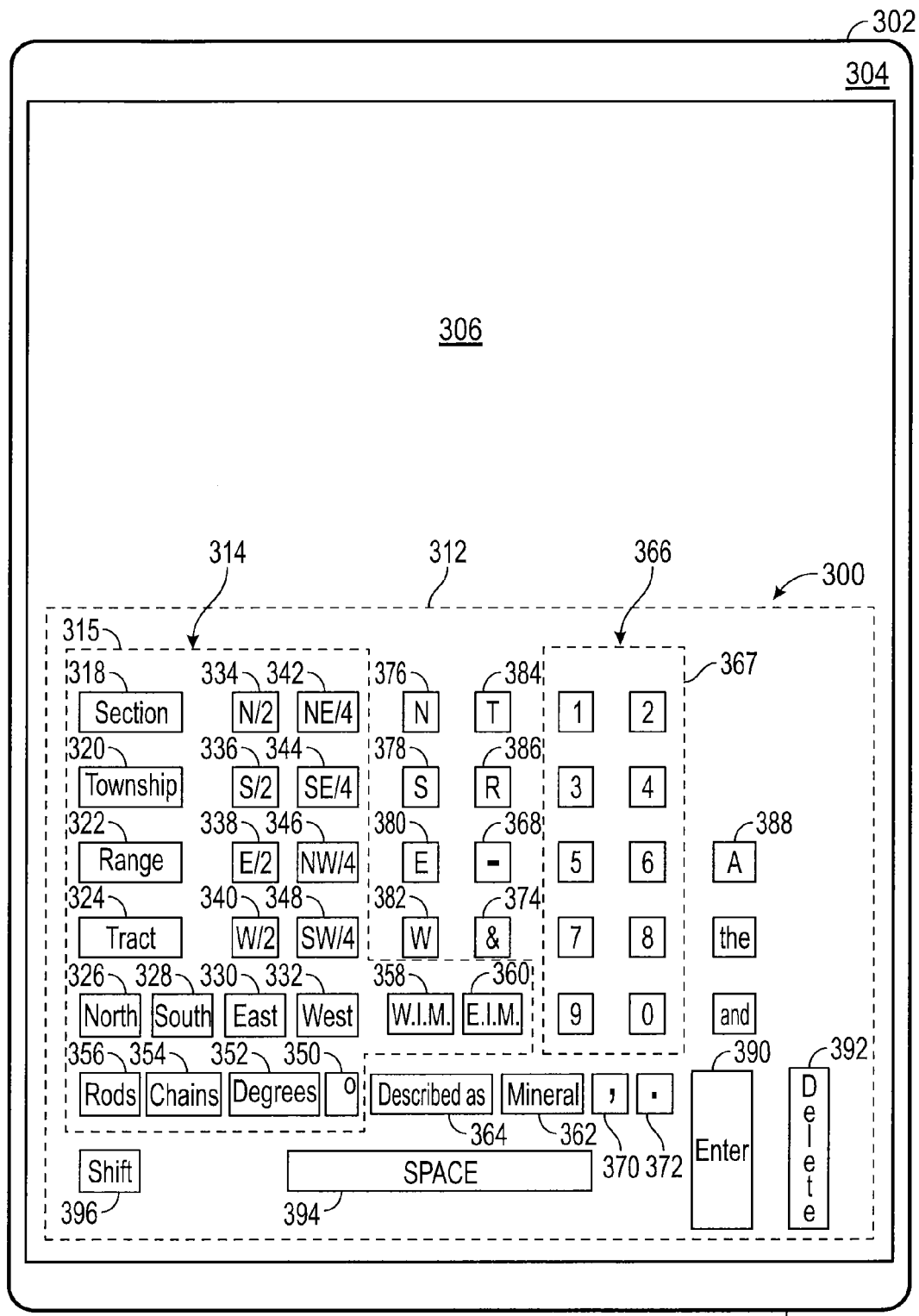
FIG. 5 illustrates an exemplary embodiment of a virtual data entry pad in conjunction with an electronic device comprising (i) a housing and (ii) a display unit, which is capable of displaying the virtual data entry pad. The virtual data entry pad comprises keys, including a plurality of geographic indication keys corresponding to a predefined sequence of characters indicative of at least one of a geographic size and/or geographic location related to land and/or mineral interests.

FIG. 5 illustrates an exemplary embodiment of the virtual data entry pad 300 (otherwise referred to herein as a "virtual keyboard") in conjunction with an electronic device 302 comprising (i) a housing 304 and (ii) a display unit 306, which is capable of displaying the virtual data entry pad 300. As previously described for FIG. 4, the virtual data entry pad 300 comprises keys 312, including a plurality of geographic indication keys 314 corresponding to a predefined sequence of characters indicative of at least one of a geographic size and/or geographic location. Although not shown in FIG. 5, the virtual data entry pad 300 further comprises circuitry comprising at least one sensor corresponding to at least one of the keys 312, a processor, and non-transient memory, wherein the circuitry (a) receives a first signal when one or more of the keys 312 are pressed or otherwise selected and (b) outputs a second signal corresponding to a character, a predefined sequence of characters, or a computer executable function corresponding to one or more of the keys 312. The circuitry is further disclosed later herein.

The electronic device 302 may be a smart phone, computer, tablet, television, and/or PDA having a display unit 306 capable of displaying a virtual data entry pad 300 comprising keys 312, including a plurality of geographic indication keys 314 corresponding to and/or having indicia thereon emblematic of a predefined sequence of characters indicative of at least one of a geographic size and/or geographic location.

In another embodiment, the electronic device 302 may further comprise an output 316, which can be an external connector and/or a wireless connector, wherein the output 316 can act as an input means for an additional electronic device. The external connector may be selected from the group consisting of a PS/2 connector, a Universal Serial Bus connector, and combinations thereof. The wireless connector may use a connection mechanism selected from the group consisting of infrared (IR), radio frequency (RF), Bluetooth, and combinations thereof In one embodiment, the display unit 306 may be, at least partially, a touch-sensitive display, otherwise referred to herein as a "touchscreen display." In a further embodiment, the display unit 306 may be, at least partially, a touchscreen display that it is capable of acting as both a display unit 306 and an input unit.

In an embodiment, at least a portion of the keys 314 of the virtual data entry pad 300 can be categorized as a plurality of geographic indication keys 314, wherein each one of the geographic indication keys 314 corresponds to a predefined sequence of characters indicative of a geographic size and/or geographic location related to land and/or mineral interests. The circuitry of the virtual data entry pad 300, as described above, both (a) receives a first signal when one or more of the geographic indication keys 314 are pressed and (b) outputs a second signal corresponding to the predefined sequence of characters corresponding to the one or more geographic indication keys 314.

For example, the predefined sequence of characters indicative of a geographic size and/or geographic location for one of the geographic indication keys 314 may, in one non-limiting example, comprise the letters "s", "e", "c", "t", "i", "o", "n" in such an order so as to output a second signal corresponding to the term "section" when the corresponding geographic indication key 314 is pressed. In another example, the predefined sequence of characters indicative of a geographic size and/or geographic location for another one of the geographic indication keys 314 may, in one non-limiting example, comprise the letter and symbols "N", "/", "2" in such an order so as to output a second signal corresponding to the abbreviation "N/2" when the corresponding geographic indication key 314 is pressed. Although FIG. 5 shows the keys as having either square or rectangle shapes, other shapes as known to a person of ordinary skill in the art may be utilized, without limitation.

In one embodiment, each one of the geographic indication keys 314 corresponds to and/or has indicia thereon indicative of a predefined sequence of characters selected from the group consisting of "section" 318, "township" 320, "range" 322, "tract" 324, "north" 326, "south" 328, "east" 330, "west" 332, "N/2" 334, "S/2" 336, "E/2" 338, "W/2" 340, "NE/4" 342, "SE/4" 344, "NW/4" 346, "SW/4" 348, "°" 350, "degrees" 352, "chains" 354, "rods" 356, "W.I.M." 358, "E.I.M." 360, and combinations thereof.

In another embodiment, the virtual data entry pad 300 comprises keys 312, wherein at least one of the keys 312 corresponds to and/or has indicia thereon indicative of a predefined sequence of characters selected from the group consisting of "mineral" 362, "described as" 364, and combinations thereof. In an embodiment, at least a portion of the keys 312 of any of the above-described embodiments of the virtual data entry pad 300 may further comprise numeric keys 366 corresponding to characters selected from the group consisting of numeric symbols ranging from 0 to 9, punctuation keys 368, 370, 372, 374, and combinations thereof. The punctuation keys 368, 370, 372, 378 may be selected from the group consisting of a hyphen 368, comma 370, period 372, ampersand 374, semicolon (not shown), underscore (not shown), parentheses (not shown), brackets (not shown), asterisks (not shown), and combinations thereof.

At least a portion of the keys 312 of the above-described embodiments of the virtual data entry pad 300 may correspond to characters that are well known by persons of ordinary skill in the art including, for example but without limitation, letters of the alphabet like N 376, S 378, E 380, W 382, T 384, R 386, and A 388.

At least a portion of the keys 312 of the virtual data entry pad 300, as described in any one of the above-mentioned embodiments, may also be characterized as one or more one functional keys 390, 392, 394, 396, wherein the at least one functional key 390, 392, 394, 396 may be selected from the group consisting of enter 390, delete 392, space 394, shift 396, and combinations thereof.

In another embodiment, the virtual data entry pad 300 comprises a plurality of distinct and non-overlapping regions encompassing keys 312 corresponding to a plurality of characters associated with a particular region. The plurality of distinct and non-overlapping regions may comprise at least one of a geographic location region 315 and/or a numeric region 367. In one embodiment, the geographic location region 315 encompasses a plurality of geographic indication keys 314 corresponding to a predefined sequence of characters indicative of at least one of a geographic size and/or location. The numeric region 367 may encompass a plurality of numeric keys 366 corresponding to characters selected from the group consisting of numeric symbols ranging from 0 to 9.

In yet another embodiment, the virtual data entry pad 300 comprising the plurality of distinct and non-overlapping regions, as described above, further comprises at least one or more keys 312 that are not within a region, wherein at least one of the keys 312 corresponds to a predefined sequence of characters selected from the group consisting of "mineral" 362, "described as" 364, and combinations thereof. Additionally, the above-described virtual data entry pad 300 comprising the plurality of distinct and non-overlapping regions, as described above, may also comprise any additional keys 312 corresponding to characters that are well known by persons of ordinary skill in the art including, for example but without limitation, letters of the alphabet like, N 376, S 378, E 380, W 382, T 384, R 386, and A 388.

The virtual data entry pad 300, as described in any one of the above-mentioned embodiments, may have the keys 312 arranged in a plurality of rows and/or columns. Alternatively, the keys 312 can be arranged in any pattern, design, or layout that may or may not include a plurality of rows and/or columns.

Figure 6:
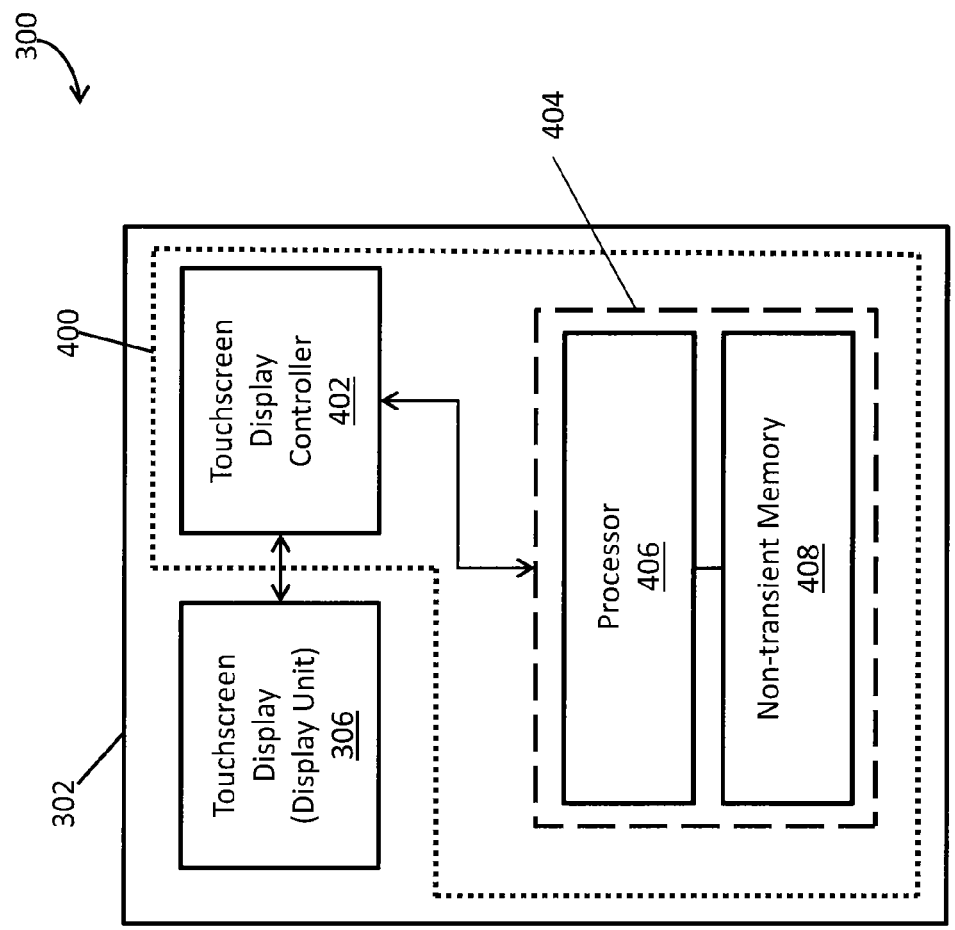
FIG. 6 conceptually illustrates, using a block diagram, an example of the circuitry of one embodiment of the virtual data entry pad, wherein the virtual data entry pad comprises an electronic device comprising a display unit that is a touchscreen display.

Turning now to FIG. 6, FIG. 6 conceptually illustrates using a block diagram an example of the circuitry of one embodiment of the virtual data entry pad 300, wherein the virtual data entry pad 300 is in conjunction with (i.e., is displayed by and/or functions with) an electronic device 302 comprising a display unit 306 that is, at least partially, a touchscreen display. In particular, the circuitry 400 comprises a touchscreen display controller 402 and a processing system 404, which comprises a processor 406 and non-transient memory 408. The touchscreen display controller 402 operates as the abovementioned sensor corresponding to at least one of the keys (not shown in FIG. 6), which works with the processing system to, for example but without limitation, (a) receive a first signal when one or more keys (not shown in FIG. 6) are pressed and (b) output (via the display unit 306 that is, e.g., a touchscreen display) a second signal corresponding to at least one of the characters, predefined sequence of characters, or computer executable function corresponding to the one or more keys (not shown in FIG. 6).

In an alternative embodiment, the above-described data entry pad may be a virtual laser keyboard (not illustrated herein). The virtual laser keyboard may comprise (i) a plurality of geographic indication keys, wherein each one of the geographic indication keys corresponds to a predefined sequence of characters indicative of a geographic size and/or geographic location related to land or mineral rights and (ii) circuitry comprising at least one sensor corresponding to at least one of the geographic indication keys, a processor, and non-transient memory. The circuitry of the virtual laser keyboard both (a) receives a first signal when one or more of the geographic indication keys are pressed and (b) outputs a second signal corresponding to the predefined sequence of characters corresponding to the one or more geographic indication keys. The keys may have any shape as known to a person of ordinary skill in the art may be utilized, without limitation.

The virtual laser keyboard is projected on a surface using a device that shines a laser through, for example but without limitation, a Diffractive Optical Element (DOE) to create the virtual laser keyboard having any of the above-described indicia. The device also comprises an infrared (IR) laser diode that runs parallel to the surface on which the virtual laser keyboard is projected. When a particular indicia is pressed by a user, the user passes through the infrared light produced by the IR laser diode, which sends a first signal to, for example but without limitation, a complimentary metal-oxide semiconductor (i.e., for example but without limitation, the "sensor"), which is analyzed by, for example but without limitation, a sensor chip referred to as a Virtual Interface Processing Core (i.e., the "processor" and "non-transient memory"), which analyzes the location of the indicia pressed on the virtual laser keyboard and outputs a second signal corresponding to at least one of the characters defined by one or more indicia pressed. As stated above, the indicia of the virtual laser keyboard may encompass any combination of the indicia described in detail herein.

Figure 7:
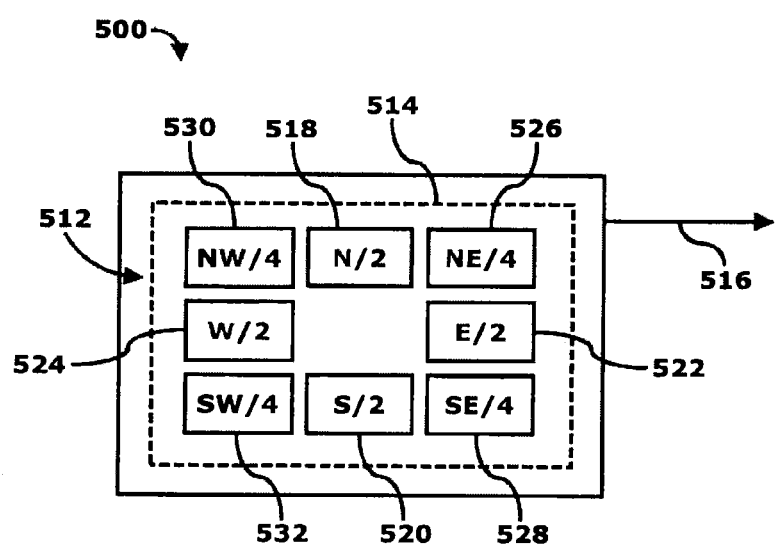
FIG. 7 illustrates an exemplary data entry pad comprising a number of keys, including a plurality of geographic indication keys with each geographic indication key corresponding to a predefined sequence of characters indicative of geographic sizes and/or geographic locations related to land and/or mineral interests.

Turning now to FIG. 7, FIG. 7 illustrates a data entry pad 500 similar to that disclosed in FIG. 1 with an alternative "ten key" arrangement for select keys 512. Generally, the data entry pad 500 comprises keys 512, including a plurality of geographic indication keys 514 corresponding to a predefined sequence of characters indicative of at least one of a geographic size and/or geographic location, and an output 516. Although not shown in FIG. 7, the data entry pad 500 further comprises circuitry comprising (i) at least one sensor corresponding to at least one of the keys 512 and (ii) a keyboard encoder comprising a processor and non-transient memory, wherein the circuitry (a) receives a first signal when one or more of the keys 512 are pressed and (b) outputs a second signal in a format readable by a keyboard controller corresponding to a character, a predefined sequence of characters, or a computer executable function corresponding to one or more of the keys 512 that are pressed. In one embodiment, the first signal may be a scan code in the form of a data packet representing the state of one or more of the keys 512. In one example, the second signal is in an ASCII format.

In one embodiment, at least a portion of the keys 512 comprise a plurality of geographic indication keys 514, wherein each one of the geographic indication keys 514 corresponds to a predefined sequence of characters indicative of a geographic size and/or geographic location related to land and/or mineral interests. The circuitry of the data entry pad 500, as described above, both (a) receives a first signal when one or more of the geographic indication keys 514 are pressed and (b) outputs a second signal corresponding to the predefined sequence of characters corresponding to the one or more geographic indication keys 514.

For example, the predefined sequence of characters indicative of a geographic size and/or geographic location for another one of the geographic indication keys 514 may, in one non-limiting example, comprise the letter and symbols "N", "/", "2" in such an order so as to output a second signal corresponding to the abbreviation "N/2" when the corresponding geographic indication key 514 is pressed. Although FIG. 7 shows the keys as having either square or rectangle shapes, other shapes as known to a person of ordinary skill in the art may be utilized, without limitation.

In one embodiment, each one of the geographic indication keys 514 corresponds to and/or has indicia thereon indicative of a predefined sequence of characters selected from the group consisting of "N/2" 518, "S/2" 520, "E/2" 522, "W/2" 524, "NE/4" 526, "SE/4" 528, "NW/4" 530, "SW/4" 532, and combinations thereof.

Although the presently disclosed and claimed inventive concept(s) has been described in conjunction with the specific drawings, description, and language set forth hereinabove, it is evident that many alternatives, modifications, and variations will be apparent to those skilled in the art. Accordingly, it is intended to embrace all such alternatives, modifications and variations that fall within the spirit and broad scope of the presently disclosed and claimed inventive concept(s).

What is claimed is:

1. A data entry pad, comprising:
    a plurality of keys, wherein a subset of the plurality of keys each corresponds to a predefined sequence of characters indicative of at least one of a geographic size and geographic location related to land or mineral interests, wherein for respective keys in the subset the predefined sequence of characters include "section", "township", "range", "tract", "north", "south", "east", "west", "N/2", "S/2", "E/2", "W/2", "NE/4", "SE/4", "NW/4", "SW/4", "degrees", "chains", "rods", "W.I.M.", and "E.I.M.", and wherein each key of the subset of the plurality of keys has indicia thereon corresponding to the predefined sequence of characters to which each key corresponds; and
    circuitry comprising at least one sensor corresponding to at least one of the keys, a processor, and non-transient memory, wherein the circuitry (a) receives a first signal when one or more of the keys are pressed and (b) outputs a second signal corresponding to the predefined sequence of characters corresponding to the one or more keys.

2. The data entry pad of claim 1, wherein the plurality of keys are first keys, and wherein the data entry pad further comprises second keys with each second key corresponding to a predefined sequence of characters selected from the group consisting of "mineral" and "described as".

3. The data entry pad of claim 2, wherein each second key corresponding to a predefined sequence of characters has indicia thereon corresponding to the predefined sequence of characters to which each second key corresponds.

4. The data entry pad of claim 1, wherein the plurality of keys are arranged in a plurality of rows and columns.

5. The data entry pad of claim 1, wherein the data entry pad is a physical keyboard connected to an electronic device by at least one of an external connector, an internal connector, and a wireless connection.

6. The data entry pad of claim 5, wherein the sensor is at least one of a mechanical switch and a capacitive switch.

7. The data entry pad of claim 5, wherein the electronic device is selected from the group consisting of smart phones, computers, tablets, televisions, and PDAs.

8. The data entry pad of claim 1, wherein the data entry pad is a virtual keyboard on a touchscreen display of an electronic device.

9. The data entry pad of claim 8, wherein the electronic device is selected from the group consisting of smart phones, computers, tablets, televisions, and PDAs.

10. The data entry pad of claim 8, wherein the first signal is an electrostatic signal provided when a user touches an area of the virtual keyboard associated with the one or more keys.

11. A data entry pad, comprising:
    a plurality of keys, wherein a subset of the plurality of keys each corresponds to a predefined sequence of characters wherein for respective keys in the subset the predefined sequence of characters include "section", "township", "range", "tract", "degrees", "rods", "mineral", "chains", "north", "south", "east", "west", "N/2", "S/2", "E/2", "W/2", "NE/4", "SE/4", "NW/4", "SW/4", "described as", "W.I.M.", and "E.I.M.", wherein each key of the subset of the plurality of keys has indicia thereon corresponding to the predefined sequence of characters to which each key corresponds; and
    circuitry comprising at least one sensor corresponding to at least one of the keys, a processor, and non-transient memory, wherein the circuitry (a) receives a first signal when one or more of the keys are pressed and (b) outputs a second signal corresponding to the predefined sequence of characters corresponding to the one or more keys.

12. A data entry pad, comprising:

a plurality of distinct and non-overlapping regions with at least one region of the plurality of distinct and non-overlapping regions encompassing a plurality of keys, wherein a subset of the plurality of keys each corresponds to a predefined sequence of characters indicative of at least one of a geographic size and geographic location related to land or mineral interests, wherein for respective keys in the subset the predefined sequence of characters include "section", "township", "range", "tract", "north", "south", "east", "west", "N/2", "S/2", "E/2", "W/2", "NE/4", "SE/4", "NW/4", "SW/4" "degrees", "chains", "rods", "W.I.M.", and "E.I.M." .", wherein each key of the subset of the plurality of keys has indicia thereon corresponding to the predefined sequence of characters to which each key corresponds; and circuitry comprising at least one sensor corresponding to at least one of the keys, a processor, and non-transient memory, wherein the circuitry (a) receives a first signal when one or more of the keys are pressed and (b) outputs a second signal corresponding to the predefined sequence of characters corresponding to the one or more keys.

13. A keyboard, comprising:

a housing;

a plurality of distinct and non-overlapping regions with at least one region of the plurality of distinct and non-overlapping regions encompassing a plurality of keys, wherein a subset of the plurality of keys each corresponds to a predefined sequence of characters indicative of at least one of a geographic size and geographic location related to land or mineral interests, wherein for respective keys in the subset the predefined sequence of characters include "section", "township", "range", "tract", "north", "south", "east", "west", "N/2", "S/2", "E/2", "W/2", "NE/4", "SE/4", "NW/4", "SW/4" "degrees", "chains", "rods", "W.I.M.", and "E.I.M." .", wherein each key of the subset of the plurality of keys has indicia thereon corresponding to the predefined sequence of characters to which each key corresponds; and circuitry comprising at least one sensor corresponding to at least one of the keys, a processor, and non-transient memory, wherein the circuitry (a) receives a first signal when one or more of the keys are pressed and (b) outputs a second signal corresponding to the predefined sequence of characters corresponding to the one or more keys.

14. The keyboard of claim 13, wherein the plurality of keys are arranged in a plurality of rows and columns.

15. The keyboard of claim 13, wherein the keyboard is connected to an electronic device by at least one of an external connector, an internal connector, and a wireless connection.

16. A keyboard, comprising:

a housing;

a plurality of keys, wherein a subset of the plurality of keys each corresponds to a predefined sequence of characters wherein for respective keys in the subset the predefined sequence of characters include "section", "township", "range", "tract", "degrees", "rods", "mineral", "chains", "north", "south", "east", "west", "N/2", "S/2", "E/2", "W/2", "NE/4", "SE/4", "NW/4", "SW/4", "described as", "W.I.M.", and "E.I.M.", wherein each key of the subset of the plurality of keys has indicia thereon corresponding to the predefined sequence of characters to which each key correspond; and circuitry comprising at least one sensor corresponding to at least one of the keys, a processor, and non-transient memory, wherein the circuitry (a) receives a first signal when one or more of the keys are pressed and (b) outputs a second signal corresponding to the predefined sequence of characters corresponding to the one or more keys.

* * * * *